(12) United States Patent
Wen et al.

(10) Patent No.: US 10,821,675 B2
(45) Date of Patent: Nov. 3, 2020

(54) INDEPENDENTLY TEMPERATURE-CONTROLLED HIGH-TEMPERATURE SELECTIVE LASER SINTERING FRAME STRUCTURE

(71) Applicant: Huazhong University of Science and Technology, Hubei (CN)

(72) Inventors: Shifeng Wen, Hubei (CN); Peng Chen, Hubei (CN); Chunze Yan, Hubei (CN); Lei Yang, Hubei (CN); Zhaoqing Li, Hubei (CN); Hongzhi Wu, Hubei (CN); Yusheng Shi, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 0 days.

(21) Appl. No.: 16/357,791

(22) Filed: Mar. 19, 2019

(65) Prior Publication Data
US 2020/0114583 A1    Apr. 16, 2020

(30) Foreign Application Priority Data
Oct. 12, 2018    (CN) .......................... 2018 1 1188659

(51) Int. Cl.
*B29C 64/153* (2017.01)
*B29C 64/393* (2017.01)
(Continued)

(52) U.S. Cl.
CPC .......... *B29C 64/393* (2017.08); *B29C 64/153* (2017.08); *B29C 64/245* (2017.08);
(Continued)

(58) Field of Classification Search
None
See application file for complete search history.

(56) References Cited

U.S. PATENT DOCUMENTS

| 6,767,499 B1 * | 7/2004 | Hory ..................... B22F 3/1055 264/497 |
| 2004/0056022 A1 * | 3/2004 | Meiners ............... B22F 3/1055 219/634 |

(Continued)

*Primary Examiner* — Timothy Kennedy
(74) *Attorney, Agent, or Firm* — Hamre, Schumann, Mueller & Larson, P.C.

(57) ABSTRACT

The present disclosure belongs to the technical field of advanced manufacturing auxiliary equipment, and discloses an independently temperature-controlled high-temperature selective laser sintering frame structure, comprising a galvanometric laser scanning system, a powder feeding chamber, a forming chamber and a heat-insulating composite plate, and targeted optimization design is performed on the respective functional components. According to the invention, the independently temperature-controlled frame structure can simultaneously ensure the uniformity of the powder preheating temperature field of the powder feeding chamber platform and the uniformity of the processing temperature field of the forming chamber platform, so that powder on the powder feeding chamber platform can reach the sinterable temperature before being conveyed, and conveyance of cold powder to the sintered melt is avoided, thereby reducing the possibility of warpage of the parts while reducing actual sintering delay time and improving actual sintering efficiency. The independently temperature-controlled frame structure of the present disclosure is particularly suitable for high-temperature laser sintering of high-performance polymers such as polyaryletherketones and aromatic polyamides at 400° C.

5 Claims, 2 Drawing Sheets

(51) Int. Cl.
*B33Y 30/00* (2015.01)
*B33Y 50/02* (2015.01)
*B29C 64/245* (2017.01)
*B29K 71/00* (2006.01)

(52) U.S. Cl.
CPC ............... *B33Y 30/00* (2014.12); *B33Y 50/02* (2014.12); *B29K 2071/00* (2013.01)

(56) References Cited

U.S. PATENT DOCUMENTS

| | | | | |
|---|---|---|---|---|
| 2016/0107229 | A1* | 4/2016 | Okazaki | B29C 64/371 |
| | | | | 425/78 |
| 2018/0043614 | A1* | 2/2018 | Greenfield | B29C 64/153 |
| 2018/0133800 | A1* | 5/2018 | Pieger | B33Y 10/00 |
| 2018/0134027 | A1* | 5/2018 | O'Neill | B23K 26/702 |
| 2018/0250737 | A1* | 9/2018 | Moosman | B22D 23/003 |
| 2018/0290210 | A1* | 10/2018 | Okazaki | B22F 3/1055 |
| 2018/0324903 | A1* | 11/2018 | Zeng | H05B 6/34 |
| 2020/0061922 | A1* | 2/2020 | Meiners | B29C 64/232 |

\* cited by examiner

INDEPENDENTLY TEMPERATURE-CONTROLLED HIGH-TEMPERATURE SELECTIVE LASER SINTERING FRAME STRUCTURE

BACKGROUND

Technical Field

The disclosure belongs to the technical field of advanced manufacturing auxiliary equipment, and more particularly relates to an independently temperature-controlled high-temperature selective laser sintering frame structure.

Description of the Related Art

Selective laser sintering (SLS) is an important branch of additive manufacturing (AM), which is based on the idea of discrete and integral. SLS uses laser to selectively scan powdered materials in a layer stacking manner to form the three-dimensional object. Compared with conventional forming techniques, the biggest characteristic of this technology is the ability to form extremely complex structural parts without molds. Therefore, SLS has been widely used in the manufacture of individualized and complex structural parts in aerospace, automotive, biomedical and other fields.

Currently, due to limitations of equipment level and forming process, SLS is mainly used to form thermoplastic polymer materials with lower melting points. PA12 and its composite (with a melting point of about 180° C.) are still the most widely used and most successful SLS materials, accounting for more than 90% of SLS commercial materials. However, for special polymer materials such as high-performance polyaryletherketones (PAEKs) and aromatic polyamides, they generally have higher melting points (for example, PAEK has a melting point of about 340° C.). In order to prevent warpage of the parts during the forming process, their preheating temperatures in the SLS forming process are required to be within a range of 330 to 337° C. (laser sintering window). As for the aged PEEK powder, the laser sintering window is narrowerand a preheating temperature of approximately 400° C. is needed, which is difficult to control.

In this case, such a high preheating temperature puts very high demands on the SLS equipment and process, which directly leads to the fact that the current SLS technology cannot realize the processing of PEEK materials successfully as long-chain polyamides, the parts are warped seriously and the processing efficiency is low. More specifically, the technical difficulties mainly focus on the following two points: (1) the powder feeding system and the forming system of the existing SLS equipment are in the same space, and preheating only needs to be performed on the forming chamber to ensure uniform temperature field, which makes the temperature of the powder feeding system lower than that of the forming system. Therefore, the conveyed feeding powder is cold and promotes the crystallization acceleration of the hot sintered melt and the temperature gradient between the surface and bottom of the melt, resulting in the part warpage and precision deviation. In severe cases, the warped part is even taken away by the powder spreading roller, resulting in the failure of the forming, which is more serious especially for high-temperature sintering; (2) the powder conveyed to the forming chamber needs to be heated to a sinterable temperature (within the sintering window) before being sintered, and thus, there is a time delay after the cold powder is conveyed to the forming platform, which increases the possibility of warpage of the part. In addition, before actually printing the parts, in order to reduce the precision deviation, multiple layers of powder pre-coating are required after the preheating temperature is reached (so that the temperature difference between the conveyed powder and the forming platform is reduced as much as possible to reduce the warpage), which seriously affects the processing efficiency.

SUMMARY

In view of the above-described defects or improvement requirements in the art, the present disclosure provides an independently temperature-controlled high-temperature selective laser sintering frame structure, in which through respectively redesign the powder feeding system and the forming system with independent space, independent preheating and temperature control of two key operations of powder feeding and forming can be achieved to significantly reduce the temperature gradient and correspondingly solve the problem of warpage of high-performance polymer materials during high-temperature laser sintering. In addition, the powder pre-coating process is not necessarily required, and the delay time before laser scanning is reduced, thereby obtaining higher processing efficiency and higher processing precision. Therefore, the frame structure of the present disclosure is especially suitable for applications such as SLS forming of special polymer materials.

Accordingly, according to the disclosure, there is provided an independently temperature-controlled high-temperature selective laser sintering frame structure, characterized in that, the frame structure comprises a galvanometric laser scanning system, a powder feeding chamber, a forming chamber and a heat-insulating composite plate, wherein the galvanometric laser scanning system includes a laser for providing a working light source and its associated lens module, and is integrally disposed above the forming chamber, so that the working light source is allowed to be irradiated onto powder on a forming chamber platform through a laser see-through window to perform selective laser sintering;

the optical thermal protection and cooling system is integrally disposed above the forming chamber of the selective laser sintering device, and includes a first protective layer, a second protective layer and a third protective layer successively laminated into a sandwich structure from bottom to top in the height direction; the first protective layer is in the form of an air-cooling structural layer, and has multiple layers of laminar flow cold air inside; the second protective layer is in the form of a water-cooling structural layer, and includes a water-cooling substrate with a built-in conformal cooling runner; the third protective layer is in the form of an air-cooling structural layer, and includes an inner air duct and an outer air duct; the inner air duct is configured to cool a laser optical module mounted on a horizontal panel, and the outer air duct is configured to accommodate the inner air duct and insulate it from other external heat sources.

the powder feeding chamber is disposed on one side the left side of the forming chamber, and includes a scraper, a powder feeding cylinder, a powder feeding chamber platform and a powder falling slot, wherein the scraper moves in the horizontal direction, i.e., the X-axis direction, during operation, so that an appropriate amount of powder on the powder feeding chamber platform is conveyed to the powder falling slot which is in controllable communication with the forming chamber, and then drops into a powder pick-up and conveyance device in the forming chamber; the powder feeding chamber is internally provided with a first infrared radiation heating device, which works as an auxiliary heating unit together with the powder feeding cylinder possessing a main heating function to perform an independently temperature-controlled preheating operation on the powder on the powder feeding chamber platform;

the forming chamber further includes a forming cylinder, a second infrared radiation heating device and a powder leakage cylinder in addition to the forming chamber platform and the powder pick-up and conveyance device, wherein the powder pick-up and conveyance device is configured to spread the powder from the powder feeding chamber onto the forming chamber platform, and then selective laser scanning is performed on the powder by means of the working light source; the second infrared radiation heating device works as an auxiliary heating unit together with the forming cylinder possessing a main heating function to perform an independently temperature-controlled preheating operation on the powder on the forming chamber platform; the powder leakage cylinder is configured to receive excess powder during powder spreading for recycling and reusing;

the heat-insulating composite plate is disposed between the galvanometric laser scanning system, the powder feeding chamber and the forming chamber to insulate them from each other; the heat-insulating composite plate is composed of a first composite plate for heat insulation in a direction perpendicular to a Y-Z plane and a second composite plate for heat insulation in a direction perpendicular to a X-Y plane, where Y-axis is defined as a horizontal longitudinal direction, and Z-axis is defined as a vertical direction; the first and second composite plates each include a plurality of graphite plates and heat-insulating material layers spaced apart from each other in a thickness direction to form a multi-interlayer structure; when the composite plate is arranged in the X-Y plane, the graphite plates are kept parallel to the powder feeding chamber platform, and when the composite plate is arranged in the Y-Z plane, the graphite plates are kept perpendicular to the powder feeding chamber platform.

Preferably, for the forming chamber, the forming chamber platform is set lower than the powder feeding chamber platform, so that the powder from the powder feeding cylinder is conveyed to the forming chamber platform through the powder falling slot in a powder falling manner.

Further preferably, the powder pick-up and conveyance device includes symmetric powder spreading rollers, whose width, rotation speed and steering are adjusted in real time by an external drive motor.

Further preferably, the powder falling slot has a switch, and the opening and closing of the powder falling slot is driven by an external executive motor; the switch is normally closed, and only when the scraper moves along the X-axis to convey the powder in the positive direction, the switch is opened to realize powder falling.

Further preferably, the frame structure further comprises an infrared heating tube assembly consisting of multi-point adaptive infrared heating tubes distributed in multiple regions with respect to a laser scanning area, and these infrared heating tubes are independently temperature-controlled, thereby further improving the temperature uniformity inside the entire frame structure.

Further preferably, the frame structure further comprises an optical thermal protection and cooling system, which is integrally disposed above the forming chamber and includes a first protective layer, a second protective layer and a third protective layer successively laminated into a sandwich structure from bottom to top in a height direction, wherein the first protective layer is disposed above the forming chamber in the form of an air-cooling structural layer, so that cold air is separated into multiple layers of laminar flow cold air through a multi-layer spoiler in the first protective layer to perform multi-layer heat exchange and heat insulation;

the second protective layer is disposed on the first protective layer in the form of a water-cooling structural layer, and includes a water-cooling substrate and a water-cooling temperature sensor; the water-cooling substrate has a built-in conformal cooling runner, and the cooling function is achieved by means of a cooling medium flowing through the conformal cooling runner; the water-cooling temperature sensor is configured to monitor an ambient temperature above the water-cooling substrate and provide monitoring feedback data to adjust an inflow temperature value of the circulated cooling medium in real time;

the third protective layer is disposed on the second protective layer in the form of an air-cooling structural layer, and includes two air ducts, i.e., an inner air duct and an outer air duct, disposed from inside to outside; the inner air duct is configured to accommodate all components of a laser optical module mounted on a horizontal panel and perform air cooling on them by means of cold air introduced via an air inlet of the inner air duct; and the outer air duct is configured to accommodate the inner air duct and insulate it from external heat sources.

Further preferably, for the first protective layer, a graphite plate is further provided at the bottom to further improve the thermal protection effect by utilizing its heat transfer anisotropy that heat is transferred in the plate plane and is hardly transferred in a direction perpendicular to the plate plane.

Further preferably, for the second protective layer, a carbon fiber support pad is further provided at the bottom of the water-cooling substrate, thereby further improving heat insulation effect while providing support and sealing.

Further preferably, for the third protective layer, it further comprises an air-cooling temperature sensor placed close to the laser of the laser optical module and used for performing real-time monitoring of the temperature of the laser.

According to another aspect of the disclosure, there is further provided a corresponding forming method, characterized in that the method comprises following steps:

Step (i): all processing parameters are set, so that the powder feeding cylinder is lifted to a certain height according to the set powder feeding coefficient, and then synchronous preheating is performed in the powder feeding chamber and the forming chamber to preheat the powder feeding chamber platform to a temperature of a ° C. and the forming chamber platform to a temperature of b° C., where both a and b are within the sintering window of the powder material;

Step (ii): the scraper in the powder feeding chamber moves in the positive direction of X-axis, and the powder falling slot is simultaneously opened with a certain opening width, so that an appropriate amount of powder is conveyed to the powder falling slot and then falls into a powder pick-up and conveyance device in the forming chamber;

Step (iii): the powder feeding device moves to spread the powder onto the forming platform, the powder spreading height being one layer thickness; meanwhile, the powder falling slot is closed, and the scraper moves in the negative direction of the X-axis to the initial position;

Step (iv): selective laser scanning is performed by the laser beam according to the layered cross-section information of the part; and Step (v): the forming cylinder is lowered by one layer thickness, the above steps are repeated to circularly perform powder feeding, powder dropping, powder spreading and sintering, finally obtaining a formed part.

In general, by comparing the above technical solution of the present inventive concept with the prior art, the present disclosure has the following beneficial effects:

1. Independent temperature control is beneficial to independent control of the temperatures of the powder feeding system and the forming system, so that powder on the powder feeding chamber platform can be heated to a sinterable temperature (within the sintering window) before being conveyed, thereby reducing the sintering delay time and improving the sintering efficiency;

2. The independently temperature-controlled frame structure can simultaneously ensure the uniformity of the powder preheating temperature field of the powder feeding chamber platform and the uniformity of the processing temperature field of the forming chamber platform, so that conveyance of cold powder to the sintered melt is avoided, thereby reducing the possibility of warpage of the parts;

3. The independently temperature-controlled frame structure is beneficial to the independent design of the preheating device, thermal protection device and other motion devices of the powder feeding system and the forming system, and the temperatures of the two parts does not interfere with each other, so that high-temperature laser sintering can be performed at 400° C.;

4. In the present disclosure, through deeply analyzing the structure and process characteristics of the existing selective laser sintering equipment, a complete set of optical thermal protection and cooling system is targetedly constructed, which not only provides effective cooling and thermal protection for the entire optical module located in the selective laser sintering equipment, but also ensures safe and stable operation even for the high-temperature selective laser sintering process, for example, at 400° C.

BRIEF DESCRIPTION OF THE DRAWINGS

In all figures, the same elements or structures are denoted by the same reference numerals, in which.

1-galvanometric laser scanning system, 2-forming chamber, 21-forming cylinder, 22-second infrared radiation heating device, 23-powder pick-up and conveyance device, 24-forming chamber platform, 25-powder leakage cylinder, 26-laser see-through window or protective glass, 3-powder feeding chamber, 31-powder feeding cylinder, 32-first infrared radiation heating device, 33-scraper, 34-powder feeding chamber platform, 35-powder falling slot, 4-heat-insulating composite plate, 41-first composite plate, 42-second composite plate, 221-infrared heating tube, 411-transverse heat-insulating graphite plate, 412-heat-insulating material layer, 421-longitudinal heat-insulating graphite plate, 43-extension plate, 351-powder falling slot switch, 5-optical thermal protection and cooling system, 51-first protective layer, 52-second protective layer, and 53-third protective layer.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

Figure 1:
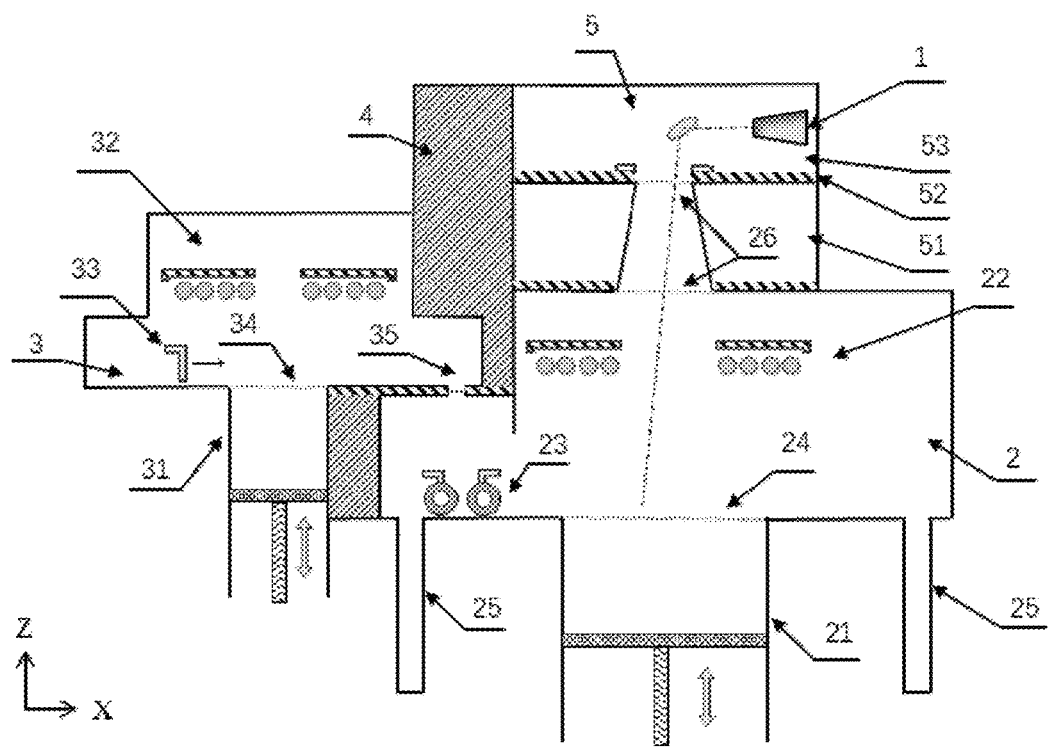
FIG. 1 is a schematic diagram showing the overall structure of an independently temperature-controlled high-temperature selective laser sintering frame structure in accordance with the disclosure.

FIG. 1 is a schematic diagram showing the overall structure of an independently temperature-controlled high-temperature selective laser sintering frame structure in accordance with the disclosure. As shown in FIG. 1, the frame structure mainly includes a galvanometric laser scanning system 1, a powder feeding chamber 3, a forming chamber 2, a heat-insulating composite plate 4 and other working modules, which will be explained one by one below.

The galvanometric laser scanning system 1 includes a laser for providing a working light source and its associated lens module, and is integrally disposed above the forming chamber 2, so that a working light source is allowed to be irradiated onto the powder on a forming chamber platform 24 through a laser see-through window 26 to perform selective laser sintering.

More specifically, the galvanometric laser scanning system 1 may include, for example, a laser, a beam expander, a focusing lens system, an objective lens, X-axis, Y-axis and Z-axis galvanometers, a control system and a cooling circulation system. The focusing system can be a static focusing system or a dynamic focusing system, and different focusing lens systems are selected according to the size of the focused scanning field of view, the size of the focusing spot on the working surface and the working distance in practice. The galvanometric laser scanning system 1 is disposed above the forming chamber 2, and laser is irradiated through a protective glass (i.e., a laser see-through window 26) to perform selective laser sintering on powder on the forming chamber platform 24.

The powder feeding chamber 3 is disposed on one side (for example, the left side as shown in the drawing) of the forming chamber 2, and includes a scraper 33, a powder feeding cylinder 31, a powder feeding chamber platform 34 and a powder falling slot 35, wherein the scraper 33 moves in the horizontal transverse direction (i.e., the X-axis direction) during operation, so that an appropriate amount of powder on the powder feeding chamber platform 34 is conveyed to the powder falling slot 35 which is in controllable communication with the forming chamber 2, and then drops into a powder pick-up and conveyance device 23 in the forming chamber. In addition, the powder feeding chamber is internally provided with a first infrared radiation heating device 32, which works as an auxiliary heating unit together with the powder feeding cylinder 31 having a main heating function to perform an independently temperature-controlled preheating operation on the powder on the powder feeding chamber platform 34.

More specifically, the powder feeding chamber 3 is disposed on one side of the forming chamber 2, and insulated from the forming chamber and the laser scanning system 1 through the heat-insulating composite plate 4; the forming chamber platform 24 is lower than the powder feeding chamber platform 34, so that the powder in the powder feeding cylinder 31 is conveyed to the forming chamber 2 through the powder falling slot 35 in a powder falling manner; the powders on the forming chamber platform 24 and the powder feeding chamber platform 34 are heated to a high temperature of 400° C. through main heating of the cylinders and auxiliary heating of the infrared radiation heating devices; the temperature field uniformity is controlled by multi-point adaptive independently temperature-controlled infrared heating tubes in 12 regions, and the forming chamber 2 is insulated from the above upper laser scanning system 1 through a heat-insulating composite plate 222 and the laser see-through window 26 (i.e., the protective glass).

Figure 2:
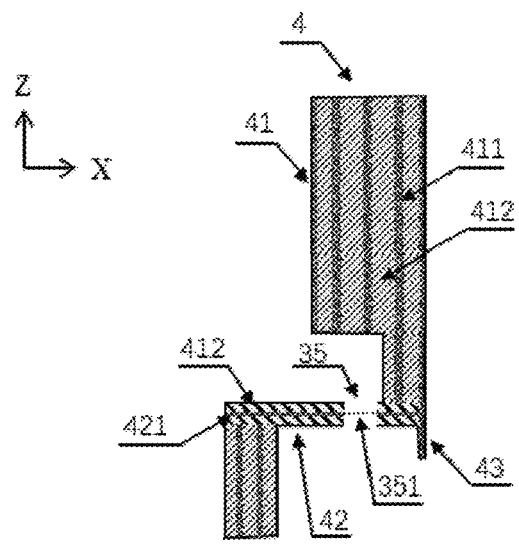
FIG. 2 is a schematic diagram showing the structure of a heat-insulating composite plate in accordance with a preferred embodiment of the disclosure.
Figure 3:
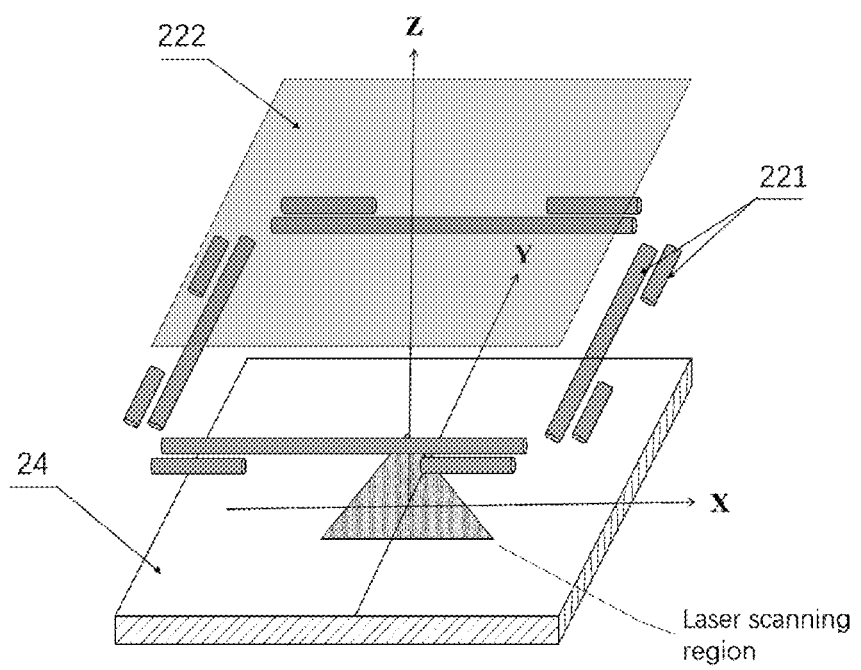
FIG. 3 is a schematic diagram showing the structure and arrangement of an infrared heating tube assembly in accordance with another preferred embodiment of the disclosure.

More specifically, as shown in FIG. 2, the powder falling slot 35 preferably has a switch 351, and the opening and closing of the powder falling slot 35 is driven by an external executive motor; the switch 351 is normally closed, and only when the scraper 33 moves along the X-axis to convey the powder in the positive direction, the switch 351 is opened to realize powder falling; and the opening width of the falling powder slot 35 can be set according to the actual powder fluidity to allow an appropriate amount of the powder to fall into the powder pick-up and conveyance device 23, and taking the PEEK powder as an example, the opening width of the falling powder slot 35 is 30 mm.

In addition to the forming chamber platform 24 and the powder pick-up and conveyance device 23, the forming chamber 2 further includes a forming cylinder 21, a second infrared radiation heating device 22 and a powder leakage cylinder 25, in which the powder pick-up and conveyance device 23 is configured to spread the powder from the powder feeding chamber onto the forming chamber platform 24, and then selective laser scanning is performed on the powder by means of the working light source; the second infrared radiation heating device 22 works as an auxiliary heating unit together with the forming cylinder 21 having a main heating function to perform an independently temperature-controlled preheating operation on the powder on the forming chamber platform 24 (preferably heating to 400° C.); in addition, the powder leakage cylinder 25 is configured to receive excess powder during powder spreading for recycling and reusing.

More specifically, as shown in FIG. 1, the powder pick-up and conveyance device 23 preferably includes symmetric powder spreading rollers whose width can be adjusted in real time by an external driving motor to receive the powder falling from the powder falling slot 35; The rotation speeds and steering of the two powder spreading rollers can be adjusted so that the powder is smoothly and flatly spread onto the forming chamber platform 24; taking PEEK powder as an example, the width between the two symmetric powder spreading rollers is 50 mm, both the left and right powder spreading rollers are rotated counterclockwise, and the rotation coefficients of the left and right powder spreading rollers are set to 20 and 10, respectively.

Referring to FIG. 2, as another key improvement of the present disclosure, a heat-insulating composite plate 4 is disposed between the galvanometric laser scanning system 1, the powder feeding chamber 3 and the forming chamber 2 to insulate them from each other. The heat-insulating composite plate is composed of a first composite plate 41 for heat insulation in a direction perpendicular to the Y-Z plane and a second composite plate 42 for heat insulation in a direction perpendicular to the X-Y plane, in which Y-axis is defined as a horizontal longitudinal direction, and Z-axis is defined as a vertical direction. Further, the first and second composite plates each include a plurality of graphite plates and heat-insulating material layers spaced apart from each other along the thickness direction to form a multi-interlayer structure. When the composite plate is arranged in the X-Y plane, the graphite plates are kept parallel to the powder feeding chamber platform, and when the composite plate is arranged in the Y-Z plane, the graphite plates are kept perpendicular to the powder feeding chamber platform.

More specifically, as shown in FIG. 2, the heat-insulating composite plate 4 is composed of a first composite plate 41 for heat insulation in a direction perpendicular to the Y-Z plane and a second composite plate 42 for heat insulation in a direction perpendicular to the X-Y plane, which respectively realize transverse heat insulation and longitudinal heat insulation; the composite plate 41 is formed by graphite plates 411 and heat-insulating material layers 412 spaced from each other to be a multi-interlayer structure, and the composite plate 42 is formed by graphite plates 421 and heat-insulating material layers 412 spaced from each other to be a multi-interlayer structure; the thermal conductivity of each of the graphite plates 411, 421 has a strong anisotropy, namely, the thermal conductivity is high in the graphite plate plane direction and the thermal conductivity is almost zero in a direction perpendicular to the graphite plate plane; when the graphite plates 421 are disposed in the X-Y plane, the plate planes are parallel to the powder feeding chamber platform, and when the graphite plates 411 are disposed in the Y-Z plane, the plate planes are parallel to the Y-Z plane and perpendicular to the powder feeding chamber platform; the heat-insulating material layer 412 may be made of one of glass fiber, asbestos, rock wool, silicate, aerogel felt and vacuum plate, or a combination thereof, and has an extension plate in the forming chamber to prevent heat from being transferred via the powder falling slot; since the powder falling slot is negligible in size with respect to the large forming chamber, and is opened by a switch only when the powder drops, heat transferred between the powder feeding chamber and the forming chamber via the powder falling slot is negligible.

In a preferred embodiment, the protective glass is preferably a high temperature resistant transparent glass ceramic, which can work continuously for 5,000 hours at 560° C. and has a thermal conductivity of less than 1.6 W/m·K, and is used as a laser see-through window to protect the above laser scanning system 1. The powder leakage cylinder 25 is configured to receive excess powder during powder spreading for recycling and reusing.

Furthermore, in accordance with another preferred embodiment of the present disclosure, the above-mentioned frame structure preferably further includes a targetedly designed optical thermal protection and cooling system.

Specifically, as shown in FIG. 1, the optical thermal protection and cooling system 5 is integrally disposed above the forming chamber 2 of the selective laser sintering device, and includes a first protective layer 51, a second protective layer 52 and a third protective layer 53 successively laminated into a sandwich structure from bottom to top in the height direction. The first protective layer 51 is disposed above the forming chamber in the form of an air-cooling structural layer, and cold air is separated into multiple layers of laminar flow cold air through a multi-layer spoiler; the second protective layer 52 is disposed on the first protective layer 51 in the form of a water-cooling structural layer, and includes a water-cooling substrate and a water-cooling temperature sensor, in which the water-cooling substrate has a built-in conformal cooling runner, thereby achieving a cooling function by means of a cooling medium flowing through the conformal cooling runner; the third protective layer 53 is disposed on the second protective layer 52 in the form of an air-cooling structural layer, and includes two air ducts (i.e., an inner air duct and an outer air duct) disposed from inside to outside; the inner air duct is configured to accommodate all components of the laser optical module mounted on a horizontal panel and perform air cooling by means of cold air introduced via an air inlet; and the outer air duct is configured to accommodate the inner air duct to insulate it from other external heat sources.

In this way, effective heat insulation of the forming chamber as well as effective thermal protection and cooling of the whole optical system can be achieved, so that the laser and other optical components are in an operating temperature range, and the forming process can be safely and stably carried out in the high temperature selective laser sintering process even at 400° C.

PEEK powder sintering is taken as an example below, with specific processing parameters shown in Table 1, to specifically explain the forming method constructed according to the frame structure of the present disclosure.

TABLE 1

SLS processing parameters of PEEK powder

| | | | |
|---|---|---|---|
| Processing temperature | 335° C. | Processing range | 0-3 mm |
| Forced heating temperature | 335° C. | Conveyance starting temperature | 333° C. |
| Temperature correction | 4 | Laser power ratio | 1.0 |
| Stepping ratio | 2602 | Opening slot width | 30 mm |
| Powder spreading stroke | 5 | Powder feeding coefficient | 13 |
| Powder pickup coefficient | 1 | Powder supplement coefficient | 0 |
| Layer thickness | 0.12 mm | Filling speed | 3000 mm/s |
| Filling power | 25 W | Filling interval | 0.15 |
| Contour speed | 800 mm/s | Contour power | 8 W |
| Scanning strategy | Contour optimization | light spot offset | 0.25 mm |

Step (1): all processing parameters were set, so that the powder feeding cylinder 31 is lifted to a certain height according to the set powder feeding coefficient, and synchronous preheating is performed in the powder feeding chamber 3 and the forming chamber 2 to preheat the PEEK powder on the powder feeding chamber platform to a conveyance starting temperature of 333° C. and the PEEK powder on the forming chamber platform to a processing temperature of 335° C.;

Step (2): the scraper 33 in the powder feeding chamber 3 moves in the positive direction of X-axis, and the powder falling slot 35 is simultaneously opened with a opening width of 30 mm, so that the PEEK powder is conveyed to the powder falling slot 35 and then falls into a powder pick-up and conveyance device 23 in the forming chamber 2;

Step (3): the powder feeding device 23 moves to spread the PEEK powder onto the forming platform 24 to form a layer thickness of 0.12 mm, thereby completing the powder spreading; meanwhile, the powder falling slot 35 is closed, and the scraper 33 moves in the negative direction of the X-axis to the initial position;

Step (4): selective laser scanning is performed on the PEEK powder on the forming platform 24 by the laser beam according to the layered cross-section information of the part; and Step (5): the forming cylinder 21 is lowered by 0.12 mm, the powder pick-up and conveyance device 23 is returned to the initial position, and then the steps (2), (3) and (4) are repeated to circularly perform powder feeding, powder dropping, powder spreading and sintering, finally obtaining a formed part.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. An independently temperature-controlled high-temperature selective laser sintering frame structure, characterized in that the frame structure comprises a galvanometric laser scanning system, a powder feeding chamber, a forming chamber, and a heat-insulating composite plate, wherein the galvanometric laser scanning system includes a laser for providing a working light source, and is integrally disposed above the forming chamber, so that the working light source is allowed to be irradiated onto powder on a forming chamber platform through a laser see-through window to perform selective laser sintering;

the powder feeding chamber is disposed on one side of the forming chamber, and includes a scraper, a powder feeding cylinder, a powder feeding chamber platform, and a powder falling slot, wherein the scraper moves in a horizontal direction that is an X-axis direction, during operation, so that an appropriate amount of powder on the powder feeding chamber platform is conveyed to the powder falling slot which is in controllable communication with the forming chamber, and then drops into a powder pick-up and conveyance device in the forming chamber; the powder feeding chamber is internally provided with a first infrared radiation heating device, which works as an auxiliary heating unit together with the powder feeding cylinder having a main heating function to perform an independently temperature-controlled preheating operation on the powder on the powder feeding chamber platform;

the forming chamber further includes a forming cylinder, a second infrared radiation heating device, and a powder leakage cylinder in addition to the forming chamber platform and the powder pick-up and conveyance device, wherein the powder pick-up and conveyance device is configured to spread the powder from the powder feeding chamber onto the forming chamber platform, and then selective laser scanning is performed on the powder by means of the working light source; the second infrared radiation heating device works as an auxiliary heating unit together with the forming cylinder having a main heating function to perform an independently temperature-controlled preheating operation on the powder on the forming chamber platform; the powder leakage cylinder is configured to receive excess powder during powder spreading for recycling and reusing;

the heat-insulating composite plate is disposed between the galvanometric laser scanning system and the powder feeding chamber, and between the powder feeding chamber and the forming chamber, to insulate them from each other; the heat-insulating composite plate is composed of a first composite plate for heat insulation in a direction perpendicular to a Y-Z plane and a second composite plate for heat insulation in a direction perpendicular to a X-Y plane, where Y-axis is defined as a horizontal longitudinal direction, and Z-axis is defined as a vertical direction; the first and second composite plates each include a plurality of graphite plates and heat-insulating material layers spaced apart from each other in a thickness direction to form a multi-interlayer structure; the first composite plate is arranged in the Y-Z plane, and its graphite plates are kept perpendicular to the powder feeding chamber platform; and the second composite plate is arranged in the X-Y plane, and its graphite plates are kept parallel to the powder feeding chamber platform.

2. The independently temperature-controlled high-temperature selective laser sintering frame structure according to claim 1, characterized in that for the forming chamber, the forming chamber platform is set lower than the powder feeding chamber platform, so that the powder from the powder feeding cylinder is conveyed to the forming chamber platform through the powder falling slot in a powder falling manner.

3. The independently temperature-controlled high-temperature selective laser sintering frame structure according to claim 1, characterized in that the powder pick-up and conveyance device includes symmetric powder spreading rollers, whose width, rotation speed, and steering are adjusted in real time by an external drive motor.

4. The independently temperature-controlled high-temperature selective laser sintering frame structure according to claim 1, characterized in that the frame structure further comprises an infrared heating tube assembly comprising of multi-point adaptive infrared heating tubes distributed in multiple regions with respect to a laser scanning area, and these infrared heating tubes are independently temperature-controlled, thereby further improving the temperature uniformity inside the entire frame structure.

5. The independently temperature-controlled high-temperature selective laser sintering frame structure according to claim 1, characterized in that the frame structure further comprises an optical thermal protection and cooling system, which is integrally disposed above the forming chamber and includes a first protective layer, a second protective layer, and a third protective layer successively laminated into a sandwich structure from bottom to top in a height direction, wherein the first protective layer is disposed above the forming chamber in the form of an air-cooling structural layer, so that cold air is separated into multiple layers of laminar flow cold air through a multi-layer spoiler in the first protective layer to perform multi-layer heat exchange and heat insulation;

the second protective layer is disposed on the first protective layer in the form of a water-cooling structural layer, and includes a water-cooling substrate and a water-cooling temperature sensor; the water-cooling substrate has a built-in conformal cooling runner, and a cooling function is achieved by means of a cooling medium flowing through the conformal cooling runner; the water-cooling temperature sensor is configured to monitor an ambient temperature above the water-cooling substrate and provide monitoring feedback data to adjust an inflow temperature value of the circulated cooling medium in real time;

the third protective layer is disposed on the second protective layer in the form of an air-cooling structural layer, and includes two air ducts having an inner air duct and an outer air duct, disposed from inside to outside; the inner air duct is configured to accommodate all components of a laser optical module mounted on a horizontal panel and perform air cooling on them by means of cold air introduced via an air inlet of the inner air duct; and the outer air duct is configured to accommodate the inner air duct and insulate it from external heat sources.

* * * * *